US012056433B2

(12) United States Patent
Zhang et al.

(10) Patent No.: US 12,056,433 B2
(45) Date of Patent: Aug. 6, 2024

(54) MULTI-MODE DISPLAY FOR DOCUMENTS IN A WEB BROWSER CLIENT APPLICATION

(71) Applicants: Atlassian Pty Ltd., Sydney (AU); Atlassian Inc., San Francisco, CA (US)

(72) Inventors: Stephanie Zhang, Redwood City, CA (US); Thomas Li, San Francisco, CA (US); Sathish Sugumaran, Sunnyvale, CA (US); Natalia Baryshnikova, San Francisco, CA (US); Branden Chaisorn, Austin, TX (US); Elizabeth Gilomen, Austin, TX (US); Christopher Bubel, Alexandria, VA (US); Jannis Hegenwald, Austin, TX (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 70 days.

(21) Appl. No.: 17/852,151

(22) Filed: Jun. 28, 2022

(65) Prior Publication Data

US 2023/0325580 A1   Oct. 12, 2023

Related U.S. Application Data

(60) Provisional application No. 63/329,437, filed on Apr. 10, 2022.

(51) Int. Cl.
*G06F 40/14* (2020.01)
*G06F 3/0482* (2013.01)
(Continued)

(52) U.S. Cl.
CPC .......... *G06F 40/106* (2020.01); *G06F 3/0482* (2013.01); *G06F 3/0485* (2013.01);
(Continued)

(58) Field of Classification Search
CPC .... G06F 40/106; G06F 3/0482; G06F 3/0485; G06F 9/451; G06F 40/109; G06F 40/117; G06F 40/205; G06F 2203/04804
See application file for complete search history.

(56) References Cited

U.S. PATENT DOCUMENTS 9,606,969 B1 *   3/2017   D ........................ G06F 16/9577
10,013,488 B1 *  7/2018   Zhao .................... G06F 16/7335
(Continued)

*Primary Examiner* — Hien L Duong
(74) *Attorney, Agent, or Firm* — Brownstein Hyatt Farber Schreck, LLP

(57) ABSTRACT

A system for displaying electronic content in one of multiple view modes using a web browser client application. Specifically, the web browser client application may present the electronic content in a first view mode in which the content displayed in a content pane that is configured to provide continuous scrolling of the content, and content tree content is displayed in a content tree pane. In response to a request to display the content of the page in a second view mode, the content is displayed in a full-screen pane that covers a substantial entirety of an available display area. The full-screen pane is configured to provide toggle-based navigation in which a user input automatically advances a display of the content to a respective topic portion identified within the content.

20 Claims, 10 Drawing Sheets

(51) Int. Cl.
*G06F 3/0485* (2022.01)
*G06F 9/451* (2018.01)
*G06F 40/106* (2020.01)
*G06F 40/109* (2020.01)
*G06F 40/117* (2020.01)
*G06F 40/205* (2020.01)

(52) U.S. Cl.
CPC ............ *G06F 9/451* (2018.02); *G06F 40/109* (2020.01); *G06F 40/117* (2020.01); *G06F 40/205* (2020.01); *G06F 2203/04804* (2013.01)

(56) References Cited

U.S. PATENT DOCUMENTS

| | | | | |
|---|---|---|---|---|
| 10,754,508 | B2* | 8/2020 | Gilmore | G06F 3/0482 |
| 11,023,675 | B1* | 6/2021 | Neervannan | G06F 16/338 |
| 11,165,911 | B1* | 11/2021 | Frolovichev | H04W 4/08 |
| 11,416,673 | B1* | 8/2022 | Peterson | G06F 3/0483 |
| 2005/0223342 | A1* | 10/2005 | Repka | G06F 3/0485 |
| | | | | 715/784 |
| 2011/0078560 | A1* | 3/2011 | Weeldreyer | G06F 3/0488 |
| | | | | 715/255 |
| 2011/0264649 | A1* | 10/2011 | Hsiao | G06N 5/022 |
| | | | | 707/739 |
| 2012/0236201 | A1* | 9/2012 | Larsen | G06Q 30/02 |
| | | | | 348/468 |
| 2013/0073932 | A1* | 3/2013 | Migos | G06F 3/0483 |
| | | | | 715/201 |
| 2014/0195961 | A1* | 7/2014 | Shoemaker | G06F 16/313 |
| | | | | 715/776 |
| 2015/0033102 | A1* | 1/2015 | Losvik | G06F 40/10 |
| | | | | 715/202 |
| 2015/0177933 | A1* | 6/2015 | Cueto | G06F 3/0485 |
| | | | | 715/776 |
| 2017/0293419 | A1* | 10/2017 | Dipin | G06F 16/957 |
| 2017/0339229 | A1* | 11/2017 | Miller | G06F 16/40 |
| 2017/0352361 | A1* | 12/2017 | Thörn | G11B 27/031 |
| 2018/0052589 | A1* | 2/2018 | Forman | G06F 3/04842 |
| 2018/0129374 | A1* | 5/2018 | Kim | G06F 8/38 |
| 2018/0129720 | A1* | 5/2018 | Kim | G06F 16/248 |
| 2019/0138657 | A1* | 5/2019 | Ikeda | G06F 3/0482 |
| 2019/0377779 | A1* | 12/2019 | Gelosi | G06F 40/137 |
| 2020/0004873 | A1* | 1/2020 | Chang | G06F 16/31 |
| 2020/0012656 | A1* | 1/2020 | Pugh | G06F 16/248 |
| 2020/0090126 | A1* | 3/2020 | Chung | G06F 40/169 |
| 2020/0218412 | A1* | 7/2020 | Zhang | G06F 40/10 |
| 2021/0192126 | A1* | 6/2021 | Gehrmann | G06N 20/00 |
| 2021/0365500 | A1* | 11/2021 | Gunaselara | G06F 16/951 |
| 2022/0063106 | A1* | 3/2022 | Chung | G06F 16/176 |
| 2022/0262358 | A1* | 8/2022 | Meriaz | G06N 20/00 |
| 2023/0111911 | A1* | 4/2023 | Druck | G06Q 10/10 |
| | | | | 715/234 |
| 2023/0161943 | A1* | 5/2023 | Morariu | G06F 40/117 |
| | | | | 715/243 |
| 2023/0205833 | A1* | 6/2023 | Saha | G06F 16/9538 |
| | | | | 715/711 |

\* cited by examiner

FIG. 3A

MULTI-MODE DISPLAY FOR DOCUMENTS IN A WEB BROWSER CLIENT APPLICATION

CROSS-REFERENCE TO RELATED APPLICATION(S)

This application is a nonprovisional patent application of and claims the benefit of U.S. Provisional Patent Application No. 63/329,437, filed Apr. 10, 2022 and titled "Multi-Mode Display for Documents in a Web Browser Client Application," the disclosure of which is hereby incorporated herein by reference in its entirety.

TECHNICAL FIELD

Embodiments described herein relate to cloud-based software platforms and, in particular, to systems and methods for providing multiple display modes for a web-based document in a web browser client application.

BACKGROUND

An organization can encourage remote collaboration by providing its employees with access to various electronic content or online documentation. In general, electronic content may be presented in a format that facilitates asynchronous viewing by members of a team or larger group in which individual members may read or interact with the content at their own pace at different times. However, electronic content that is adapted for individual viewing may be difficult to navigate during a shared viewing experience like a videoconference or a shared desktop environment. In particular, certain content that may be suitable for self-directed viewing by individual users may be presented in a way that dilutes or obfuscates key elements of the content or makes it difficult to synchronize the group's consumption of the content.

The systems and techniques described herein are directed to a cloud-based interface to a documentation system that provides multiple display modes through a web-based client application.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 3A-3B depict example views of a frontend application displaying content in accordance with a first view mode.

The use of the same or similar reference numerals in different figures indicates similar, related, or identical items.

Figure 1:
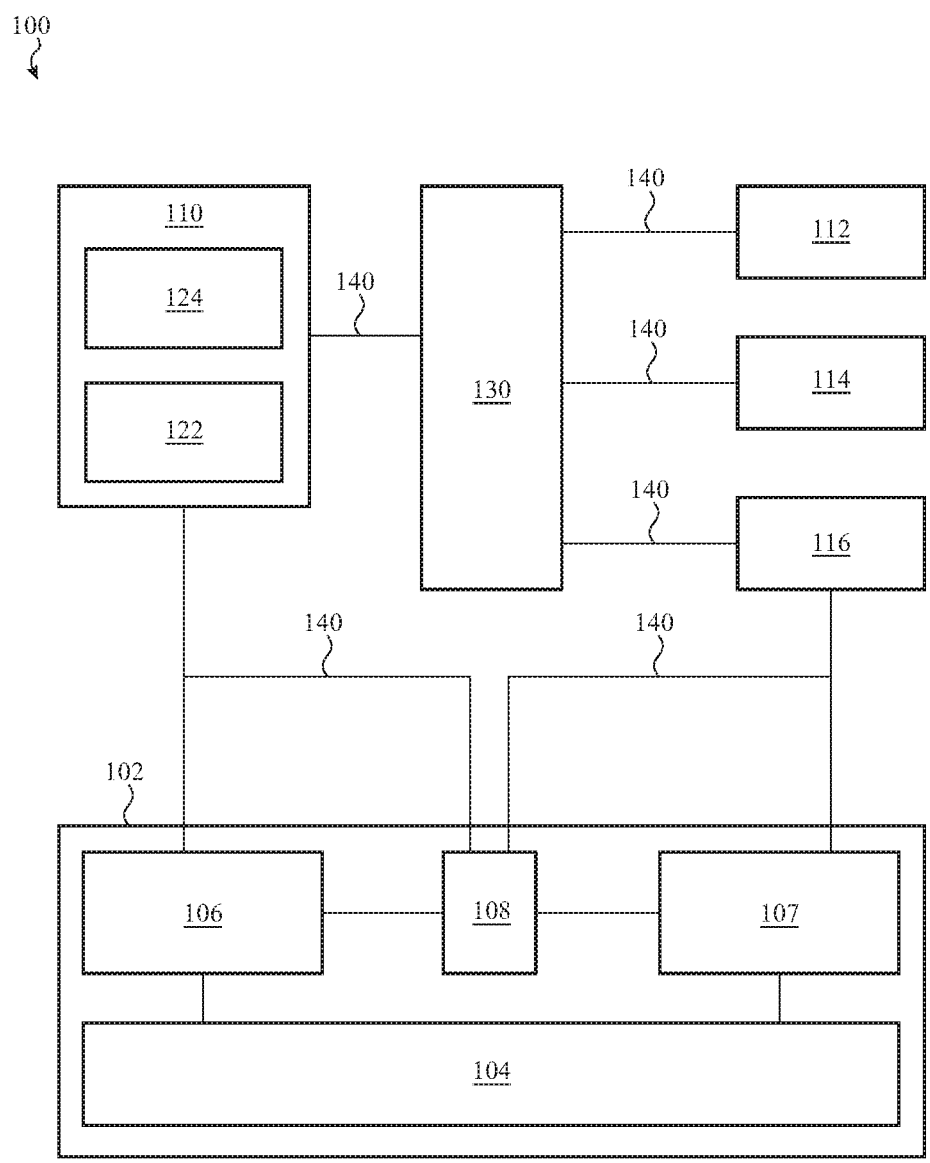
FIG. 1 depicts a system for providing content to client devices in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The systems and techniques described herein can be used to display or present content in one of a multiple modes, each mode configured to display content in a way that may be optimized for a particular viewing scenario. In general, an organization can use a content collaboration platform to facilitate the creation and dissemination of documentation, project plans, technical details, and other content among a group of users or a team. A content collaboration platform may further be adapted to present content using a web-browser interface to allow for viewing on a broad range of client devices having web-enabled applications. The user interface may be specially adapted for peer-to-peer collaboration and allow for detailed content without substantial restrictions on page format or content length. The user interface may also allow for rich content features including in-line comments, content tree navigation panes, and other features that facilitate navigation and collaboration by individual users. While such an interface may be efficient for collaboration with individual users, the same interface may not be suitable for easily sharing in a group viewing setting. In particular, when sharing content using a live video conference or other real-time communication tool, the detailed and rich content may be distracting and it may be difficult to communicate core themes and/or a narrative when viewing the document simultaneously.

To address this potential problem, the systems and techniques described herein are configured to display content in multiple modes, depending on a use case for a particular piece of content, which may improve efficiency for the user by tailoring the content for a particular scenario. The proposed solutions may also provide an improved use of limited resources by reducing the amount of data required for real-time communication tools like a video conference or screen sharing operation. The proposed solutions may also reduce the amount of memory and other resources required since the multiple view modes may not require generation and storage of multiple copies or versions of the same content.

As described herein, a content collaboration platform may be configured to present content as part of a page, online document, or other form of electronic media. The content may be displayed in accordance with one of multiple different modes, which may be invoked in response to a user input provided to the user interface. In particular, the content collaboration platform may be configured to present the page or document in accordance with an asynchronous view mode that may be adapted for detailed review and consumption by individual users. The asynchronous view mode may present content in an interface that provides for continuous and uniform scrolling. This mode may display the content as a continuous field or region that can be scrolled using a scroll bar or a scrolling user input provided via a mouse, trackpad, or other user input device. This mode may also be referred to herein as a non-paginated view mode in which the content is able to be scrolled or navigated without page breaks, page edges, or other regularly occurring segmentation of the content.

The content collaboration platform may also be configured to present the same content in accordance with a synchronous view mode that may be adapted for group viewing using a shared screen, videoconference, or other similar electronic communication tool. The synchronous view mode may present the content in an interface that is adapted for what is referred to herein as toggle-based scrolling or topic-based scrolling. This mode may also be referred to herein as a toggling view mode or continuously paginated view mode in which the content may be advanced in accordance with a set of topic portions that have been identified in the content. In response to a user input, such as the arrow keys on a keyboard, the document may be scrolled in increments that are defined by respective identified content. However, in contrast with a hard paginated document defining regular or uniform page breaks, the toggle-based scrolling allows for navigation that is tailored to the content of the page rather than to a predefined page size or scroll distance. Further, as described herein, the topic portions may be emphasized with respect to other content being contemporaneously displayed in the interface. For example, the topic portion may have an increased size, increased darkness, or other visually distinct characteristic, as compared to the other content being displayed. By way of further example, the other content being displayed may be de-emphasized by being muted, ghosted, have a darkness that is reduced as compared to the current topic portion, or otherwise provide for a visual distinction that emphasizes the current topic portion.

In accordance with some embodiments described herein, the synchronous view mode (also referred to as a toggling view mode or continuously paginated view mode) may be presented in a full-screen pane in which the content of the current page or document is displayed over a substantial entirety of a view area defined by the web browser client application. In some cases, the full-screen pane extends across a substantial entirety of the display of a particular client device or an available view port, as defined by a screen share service, video conference service, or other electronic communication tool.

Further, the synchronous view mode or continuously paginated view mode may omit or suppress the display of content tree panes, in-line comments, or other electronic content that would otherwise be displayed in an asynchronous or non-paginated view mode. This allows for a more focused and effective presentation of the core information in the content and allows the presenter to use the content to provide a narrative or more uniform delivery of the content. As described herein, while the display of some content may be suppressed in a particular view mode, the content is preserved with respect to the page or document and may be revealed again when the viewing mode of the content is changed or reverted.

In accordance with some embodiments, the content may be parsed in order to identify a set of topic portions within the content of the page or document. The set of topic portions may be identified in accordance with one or more tags or other properties of the content in the document or page. For example, the topic portions may be identified based on portions of the content tagged as header text, body text, multimedia content, or other definable portion of the content. In some cases, the topic portions are identified using a node structure, hierarchical element structure, or other similar structure of the document or page content.

In some embodiments, parsing the content may also identify text having a font size or other property that satisfies a criteria used to identify content that may be difficult to read in a synchronous or continuously paginated view. The identified text or other portions of the page or document may be converted into content that is more readily viewed in the particular mode, or the content may be omitted, or display of the content suppressed in the particular mode. For example, text having a font size that is below a particular threshold or having a font that is not compatible or not visually congruent with other content in the page or document may be converted to have a conforming font size, font, or other appearance before being displayed in the synchronous or continuously paginated view. In some cases, the font size or display size of the text is adjusted in accordance with a detected physical display size or resolution of the presenter or main user's device. In some cases, the font size or display size of the text is determined based on an estimated or detected shared display portal or window size or resolution. The shared display portal or window size may be determined by a videoconferencing service or other communication platform.

The systems and techniques described herein may be used to provide alternative versions of a page or document without creating a persistent copy that is stored by the platform or service. While copies or versions may be created, it is not necessary to create a persistent copy of the alternative version in order to create the different view modes, described herein. This reduces common problems associated with divergent content in which edits must be propagated across multiple versions or copies of a document in order to prevent divergent or out-of-date content in the platform. This scheme allows for a user to edit a common or shared document or page, and the changes may be visible across each of multiple view modes.

The synchronous view mode or continuously paginated view mode may be initialized at the beginning of the content in order to present the entirety of the content from start to finish. However, the synchronous view mode or continuously paginated view mode may also be initialized or invoked further down into the content after a portion of the content has been displayed or after the use has navigated away from the beginning of the content. This allows the user to transition between modes throughout the content in order to reveal more detailed features or content, as necessary. The synchronous view mode or continuously paginated view mode may be resumed after toggling to another display mode, regardless of the current cursor location within the content. In some cases, resuming or invoking the synchronous view mode or continuously paginated view mode causes the mode to focus on an object or element of the content that is proximate to the current cursor position. In some cases, the next object or element below the current cursor position becomes the first topic portion that is highlighted or emphasized in the synchronous view mode or continuously paginated view mode.

As noted above, a software platform as described herein may include a frontend and a backend configured to communicably couple over a computing network (which may include the open Internet or other distributed network) to exchange computer-readable structured data. Many software platforms described herein may be architected as software as service platforms configured to operate over the open Internet to render custom webpages within user browser windows, although it may be appreciated that this is merely one example construction and other embodiments can be implemented with native applications.

A frontend or frontend application, as described herein, may be a first instance of software executing on a client device, such as a desktop computer, laptop computer, tablet computer, or handheld computer (e.g., mobile phone). The backend or backend application may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

As noted above, a frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval.

One example architecture includes a graphical user interface rendered in a browser, also referred to herein as a web browser client application, executing on the client device. In other cases, a frontend may be a native application executing on a client device. Regardless of architecture, it may be appreciated that generally and broadly a frontend of a software platform as described herein is configured to render a graphical user interface that includes an interface to content (pages, documents, and other objects) provided by a collaboration platform and to the user of the software platform.

For simplicity of description, the embodiments that follow reference a configuration in which a system is able to present a page or document in one of multiple view modes—but it may be appreciated that this is merely one example and other configurations and constructions are possible.

These foregoing and other embodiments are discussed below with reference to FIGS. 1-5. However, those skilled in the art will readily appreciate that the detailed description given herein with respect to these figures is for explanation only and should not be construed as limiting.

FIG. 1 depicts a simplified diagram of a system, such as described herein. The system 100 is depicted as implemented in a client-server architecture, but it may be appreciated that this is merely one example and that other communications architectures are possible. The system 100 may also be referred to as a web-service or Software as a Service (SaaS) architecture in which platform functionality and services are provided to client devices via a web or web-based interface.

The networked computer system or system 100 of FIG. 1 depicts an example configuration in which multiple client devices 110, 112, 114, and 116 may access either a set of host servers 102 or communication platform 130 via a computer network 140. The computer network 140 may include a distributed network which may include local networks, gateways, and networking services provided by one or more internet service providers. The client devices 110, 112, 114, and 116 are able to view and share content via the network 140 either directly or through the various services provided by the set of host servers 102 or the communication platform 130.

The set of host servers 102 may include multiple platform services provided by, for example, first backend 106 and second backend 107. The first backend 106 may for part of a content collaboration platform, which may include a document creation and management service, content wiki services, messaging and event feed services, and other collaboration or data management services. The second backend 107 may a second instance of similar services or, alternatively, may provide different services including, for example, issue tracking services for creating, managing, and tracking issues for software development, bug tracking, and/or information technology service management (ITSM) services. The second backend 107 may also provide an interface for a code repository, a deployment management system, or other system or service used to track and manage versioned object storage.

The communication platform 130 may include one or more services that are configured to facilitate electronic communications between the client devices 110, 112, 114, and 116. For example, the communication platform 130 may include a video conferencing service that facilitates real-time electronic communication using one or more live video feeds and screen sharing services. The communication platform 130 may also include another real-time communication service including, for example, a web-enabled whiteboarding service that allows multiple client devices to share content and edit a common collection of whiteboard objects or elements. In some cases, the communication platform 130 may include a presentation service that is configured to broadcast or display a live or recorded presentation of content that may include video, audio, or graphical user interface or other computer-rendered content.

The communication platform 130 may interface with one or more client applications 124 over network 140 to provide the communication services. The client device depicts an example client application 124, which may include a dedicated client-side application or may be a web browser client application. While the client application 124 is depicted only with respect to client device 110, the other client devices 112, 114, and 116 may include all of the elements or features of client device 110.

As shown in FIG. 1, the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices. Multiple example devices are shown as the client device 110, 112, 114, and 116. The client devices 110, 112, 114, and 116 can be implemented as any suitable electronic device. In many embodiments, the client device 110, 112, 114, and 116 are personal computing devices such as desktop computers, laptop computers, or mobile phones. This is merely one example and is not required of all embodiments. An example hardware configuration of a client device is provided in FIG. 5, described below.

Figure 5:
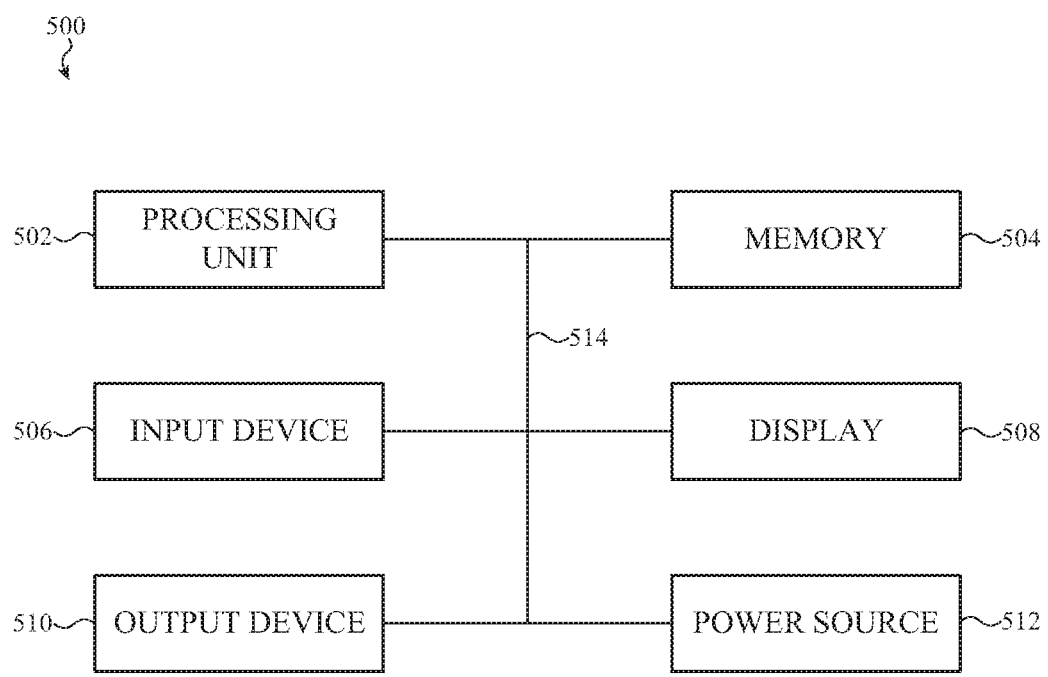
FIG. 5 depicts an example hardware for devices of the systems described herein.

The set of host servers 102 can be supporting infrastructure for one or more backend applications, each of which may be associated with a particular software platform, such as a documentation platform or an issue tracking platform. In particular, a portion of the set of host servers 102 can be allocated as physical infrastructure supporting a first platform backend 106 and a different portion of the set of host servers 102 can be allocated as physical infrastructure supporting a second platform backend 107. FIG. 5, described below, provides an example of various hardware elements that are used by the physical infrastructure supporting one or more of the host servers 102.

As noted with respect to other embodiments described herein, the two different platforms may be instantiated over physical resources provided by the set of host servers 102. Once instantiated, the first platform backend 106 and the second platform backend 107 can communicably couple to a shared data store 104 or other data repository. The data store 104 may include a shared multitenant storage system that hosts data from multiple tenants and multiple platforms for use within a specific region or realm.

More specifically, the first platform backend 106 can be configured to communicably couple to a first platform frontend 122 instantiated by cooperation of a memory and a processor of the client device 110. Once instantiated, the first platform frontend 122 can be configured to leverage a display of the client device 110 to render a graphical user interface so as to present information to a user of the client device 110 and so as to collect information from a user of the client device 110.

The first platform frontend 122 can be configured to communicate with the first backend 106 and/or the second backend 107. Information can be transacted by and between the first platform frontend 122, the first backend 106, and the second backend 107 in any suitable manner or form or format. In many embodiments, as noted above, the client device 110 and in particular the first platform frontend 122 can be configured to access either or both of the first backend 106 or the second backend 107 via an authentication service 108, which may authenticate a token or other user credentials transmitted along with a request for access or data provided by the respective backends.

Figure 2A:
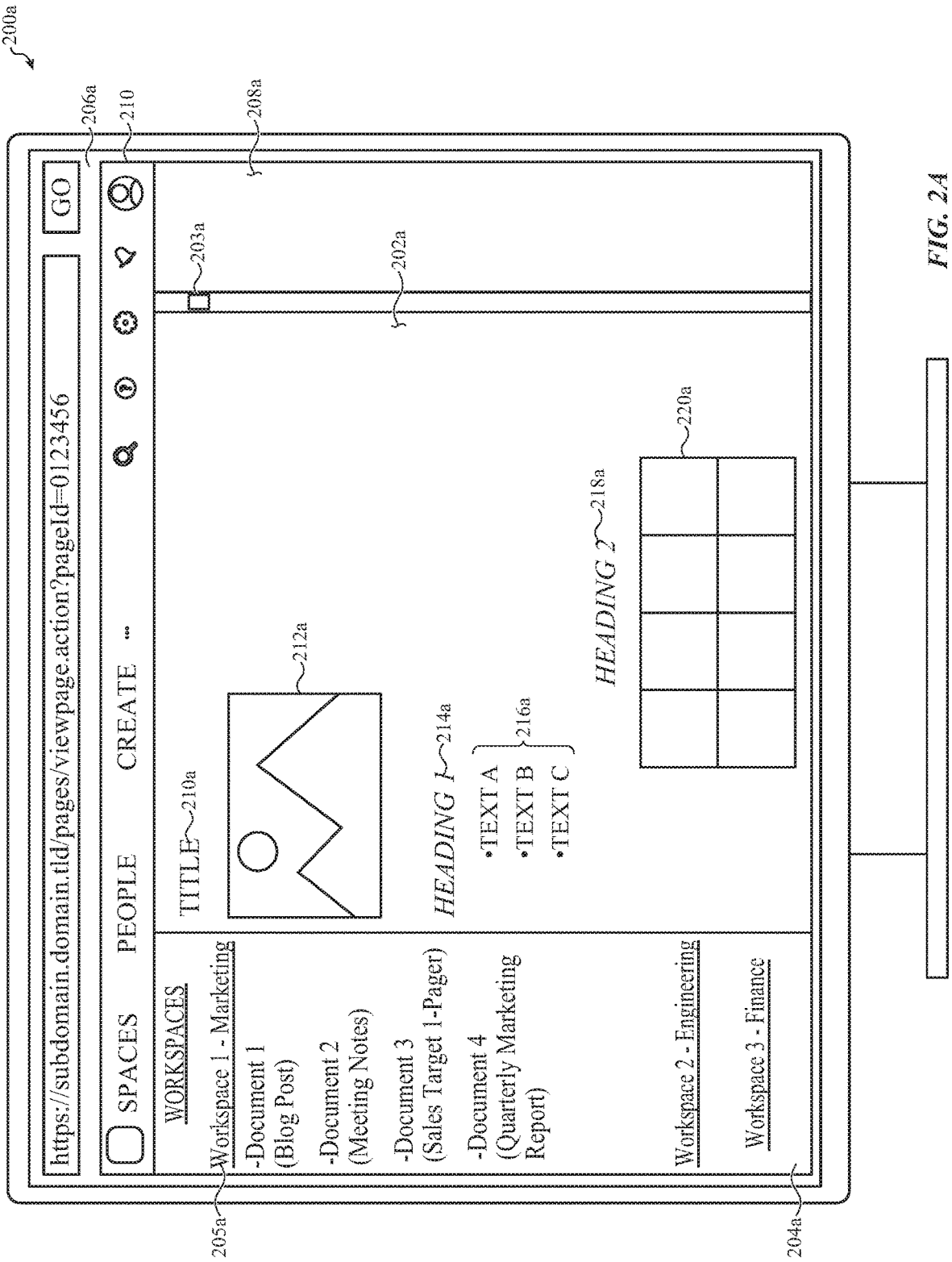
FIG. 2A depicts an example view of a frontend application displaying content in accordance with a first view mode.

Generally and broadly, FIG. 2A depicts a graphical user interface of a software platform configured to present or display electronic content in one of a multiple view modes, in accordance with the present disclosure. Specifically, FIG. 2A depicts a first view mode 200a of a page or electronic document, which is being displayed by a web browser client application instantiated on a client device. The example first view mode 200a may correspond to what is referred to herein as an asynchronous view mode, a non-paginated view mode, or a free-scroll view mode. Generally the first view mode 200a includes a content pane 202a displaying content in a non-paginated fashion that is free of regularly repeating page breaks or page delineation. The page size may correspond to a predefined electronic page size that may correspond to a traditional paper size (8.5 inches by 11 inches) or other standardized page constraint. The content pane 202a may also be configured to provide continuous and uniform scrolling of the content in response to user input including, for example, a scroll input from a mouse or trackpad, input provided to a scroll bar element 203a positioned along a side of or within the content pane 202a, or in response to a gesture or other input command. For documents or pages having sufficient content, scrolling of the content is necessary in order to view all of the content.

As shown in FIG. 2A, the first view mode 200a may also include multiple other panes or regions in addition to the content pane 202a. Specifically, the first view mode 200a in this example includes a content tree pane 204a, which may also be referred to herein as an object tree pane, page tree pane, document tree pane, or navigation pane. The content tree pane 204a includes a content tree 205a of selectable elements, which may also be referred to herein as an object tree, page tree, document tree, or navigation tree. An example of a content tree pane is also provided herein with respect to FIGS. 3A-3B, described below. Generally, the content tree pane 204a includes a content tree 205a having multiple selectable entries or elements, each entry or element corresponding to a page, document, or other electronic content having a hierarchical relationship to the content displayed in the content pane 202a. Selection of a particular entry or element in the content tree 205a may result in the content pane 202a displaying content corresponding to the particular entry. The entries or elements may have a nested or parent-child hierarchical relationship that can be manipulated or modified in response to user input provided to the content pane 202a.

As shown in FIG. 2A, the first view mode 200a may also include other panes or regions in addition to the content pane 202a and the content tree pane 204a. Specifically, the first view mode 200a in this example includes a header 206a, which may display controls and user interface elements associated with the browser control. For example, the header 206a may include browsing tabs, each tab associated with a different URL or other target designation, which may be viewed and edited in an address bar or field. The header 206a may also include elements for printing, bookmarking content, sharing content, or providing quick access to bookmarked content.

As shown in FIG. 2A, the first view mode 200a also includes an auxiliary content pane 208a. The auxiliary content pane 208a may include narratives for in-line comments embedded in the content displayed in the content pane 202a, notes associated with the content, version or content history, or other auxiliary content related to or supplemental to the content depicted in the content pane 202a. In some cases, the auxiliary content depicted in the auxiliary content pane 208a automatically scrolls in accordance with a scroll operation performed on the content pane 202a. In some cases, the auxiliary content pane 208a may also be scrolled independent of the content pane 202a.

In the example of FIG. 2A, the content pane 202a includes content that is displayed in response to a request to view the respective page or document. Specifically, the content includes the title 210a, a multimedia object (image, graphic, video, or audio) 212a, one or more headings 214a, 218a, body text 216a, and other content 220a (in this case, a table of elements or content). While not depicted in FIG. 2A, the content may be scrolled or moved to reveal additional content that extends beyond the viewable area of the content pane 202a.

The content of the page or document may be tagged or marked in accordance with a particular document protocol. For example, the page or document may be tagged or marked in accordance with an Atlassian Document Format (ADF), Hyper Text Markup Language (HTML), Extensible Markup Language (XML) or other document format. In particular, the content of the page or document may be tagged or marked with a header tag, heading tag, body tag, body text tag, multimedia tag, quote block tag, code block tag, link or embedded content tag, and other tags or markups. In some cases, the header tag designates a #sign or other indication of a level of hierarchy.

As described herein, the various tags or markings present in the document may be used to identify a series or set of topic portions that can be used for navigation in a second view mode, depicted below with respect to FIG. 2B. In particular, the content of the page or document may be parsed to identify topic portions based on tagged or marked text. In parsing the content of the page, topic portions may include text tagged as a header, which in the example of FIG. 2A may include the title 210a and headings 214a and 218a. Header tags that correspond to empty text regions or null content may be ignored and not designated as a topic portion. In parsing the content of the page, topic portions may also include text tagged as body text, quote block, code block, or multimedia. Again, any tagged content having blank or null content may be ignored and not designated as a topic portion. In the following example, each of the respective content portions 210a, 212a, 214a, 216a, 218a, and 220a may be designated as a topic portion and used to advance or toggle-based scroll through the content in a second view mode. The parsing of the document or page may be used to create a special Document Object Module (DOM) having nodes that correspond to the identified topic portions.

In accordance with some embodiments, during the parsing operation, blocks of text or content may be evaluated with respect to a criteria. In accordance with an evaluation of the content with respect to the criteria, the portion of the document may be assigned a topic portion, be divided into multiple topic portions, or may be ignored or suppressed for display in the second view mode. For example, a block of text, table, or other type of content may have a length that exceeds a predetermined threshold (example criteria). In accordance with the content exceeding the threshold, the portion of content may be divided into two or more topic portions. This may allow for incremental viewing of the content when the content is viewed in the second view mode. By way of other example, if the portion of the content is found to include untagged content, null content, blank space, or other similar content, the portion of content may be ignored for purposes of assigning a topic portion and/or may be suppressed from display in the second view mode. In some cases, text having a font size that is below a threshold size or that satisfies some other font size criteria or text property criteria may be not identified as a topic portion. Depending on the implementation, the text may be modified or adapted to have an increased font size or modified text property to be displayed in the second view mode. In other implementations, the text may be ignored or the display of the text may be suppressed in the second view mode.

Similarly, on parsing the content, additional elements may be converted or the display of the elements may be suppressed in the second view mode. For example, in-line comments, note fields, document metadata, or other supplemental content that may be displayed in the first view mode may be suppressed from display in the second view mode. In some instances, this content may also be converted into a standard text format in accordance with the second view mode settings and displayed in the second view mode. For example, in-line comments may be converted to text having a specified font size and type and placed in a table or under a heading indicating the text as being in-line comments when the content is viewed in a second view mode. The converted content may also indicate the author of the comments, time and date of the comments, and/or other properties of the in-line comments that might not otherwise be displayed.

In general, the content displayed in the content pane 202a may also be edited by the user. For example, editing in the content pane 202a may be enabled by invoking an edit mode using a control (e.g., CREATE) of the first view mode. Before an edit mode may be invoked, user permissions and/or a user authorization operation may be updated or checked and the edit mode may be denied or restricted based on the user's permissions or authorization status. When in an edit or edit-enabled mode, the user may add content to the page or document, which may include additional text, multimedia content, links, or other content. Note that in some implementations, a user does not need to enter and edit or an edit-enabled mode to enter in-comments or notes. However, the ability to add in-line comments or notes may be restricted to a particular class of users or user roles. In some instances, special fields or regions, like a comment section or region, may accept input from a broad class of users without invoking an edit or an edit-enabled mode.

As discussed previously with respect to FIG. 1, the software platform may be defined by a frontend application instantiated by a client device and a backend application instantiated by a host server, whether virtual or physical. The backend application can be communicably coupled to the frontend application so as to receive inputs from and to provide information to a user of the frontend application. In addition, the backend application (and/or the frontend application) can be communicably coupled to a content store or shared data store (e.g., 104 of FIG. 1), which may also be instantiated on a host server, whether virtual or physical. In this construction, the backend application and/or the frontend application can submit requests to and receive inputs from each end in order to create and display content of the page or document for display in the graphical user interface of the frontend application. In some cases, backend applications can be configured to transmit to the frontend application an executable file or script, such as a JavaScript™ file or script, that when executed by the frontend application causes it to be rendered in the graphical user interface of the frontend application, which can receive user input.

As with other embodiments described herein, the backend application can be coupled to the frontend application (e.g., via WebSockets) in order to receive and parse user input to the document or page in real time or near real time. For example, as a user of the frontend application begins providing text input, the partial text input can be transmitted back to the backend application for analysis and/or other processing (e.g., spell checking, grammar checking, slash command syntax checking, and so on). In some cases, the frontend application and the backend application can cooperate to analyze user input. For example, the frontend application may be configured to monitor for a particular user input, after which the frontend application can communicate with the backend application to provide the corresponding functionality.

Figure 2B:
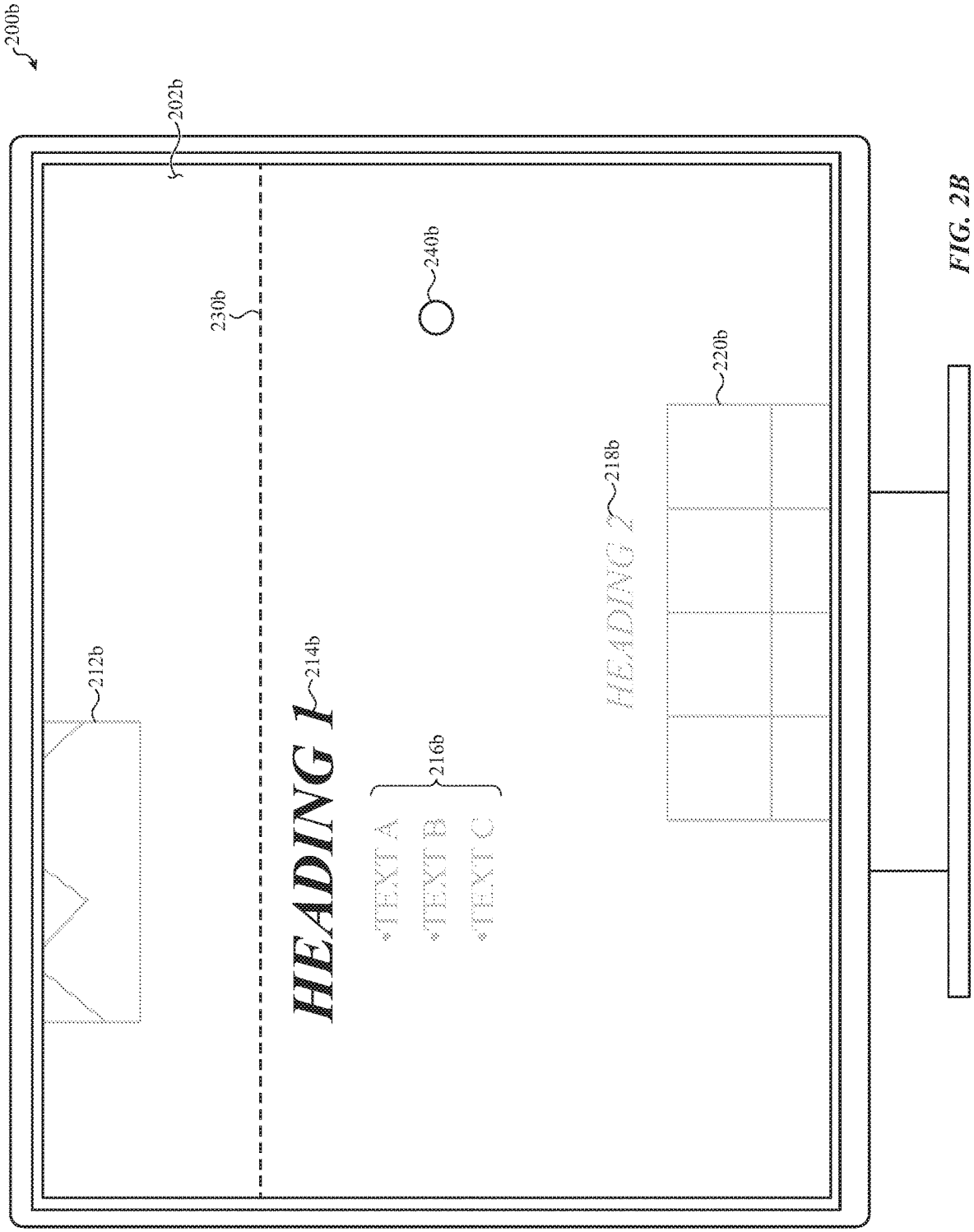
FIG. 2B depicts an example view of a frontend application displaying content in accordance with a second view mode.

FIG. 2B depicts an example view of a frontend application displaying content in accordance with a second view mode 200b. Specifically, FIG. 2B depicts a full-screen pane 202b that covers a substantial entirety of the available display area. As shown in FIG. 2B, the full-screen pane results in a suppressed or hidden display of the header (e.g., 206a of FIG. 2A), the content tree pane (e.g., 204a of FIG.

2A), and any auxiliary panes (e.g., 208a of FIG. 2A). This results in the suppression or omission of content including the content tree, in-line comments, notes, and other content that may have been displayed in the first view mode. In this example, the available display area is the usable area of the display hardware. However, in other cases, the available display area may be defined by a view portal of a communication service like a video conference application or screen sharing service. That is, it is not necessary that the full-screen pane 202b encompass a substantial entirety of the display screen hardware.

The second view mode depicted in FIG. 2B provides what is referred to herein as toggle-based navigation or continuous pagination. In particular, the frontend application accepts a user input, which is used to automatically advance the display of the content to a respective topic portion identified within the content. Specifically, using a directional indication input (e.g., selection of an arrow key, arrow UI button, or mouse gesture input) the interface is configured to toggle or advance between topic portions of the content, which have been identified in accordance with the markup or tags in the content or other content analysis scheme. In this way, the user may navigate back and forth through the document in amounts that track the content itself rather than the regular predefined intervals associated with a traditional page advance command.

By way of example, a user input indicating a down or advance direction results in the content displayed in panel 202b advancing until the next topic portion aligns with a navigational reference line 230b. In this example, the next topic portion corresponds to the "Heading 1" text, which may have been identified based on the header tag in the original content. An additional user input indicating another down or advance direction results in the content being automatically scrolled until the top of body text 216b is aligned with the navigational reference line 230b. Subsequent input can be used to navigate further down the document to align topic portions heading 218b ("Heading 2") and table 220b with the navigational reference line 230b. Similarly, user input indicating an up or return direction results in the content automatically being scrolled upward until the next topic portion aligns with the navigational reference line 230b. Note that the navigational reference line 230b is depicted as a dotted line in FIG. 2B in order to illustrate the alignment principle but, in a typical implementation, the navigational reference line 230b will not be displayed during normal viewing conditions. In some cases the position of the navigational reference line 230b may be adjusted or modified by the user in order to be closer to the top of the screen, closer to the middle of the screen, or closer to the bottom of the screen. In some cases, a graphical element like a slider or visual indicator can be used to adjust the position of the navigational reference line 230b.

In the present example, the second view mode 200b may be implemented using a web browser client application, which is generally configured to view web pages and other web content. Specifically, the full-screen pane 202b of the second view mode 200b may be invoked using an API of the web browser (e.g., requestFullscreen), which may be used to mount a special second view mode portal. The portal may be rendered on top of the normal page view, depicted as, in this example, the first view mode of FIG. 2A. The newly created portal may execute one or more queries to fetch the content associated with the page or document. Specifically, a GraphQL query may be used to obtain the cover photo, title, and initial portion of the content from the backend application or content storage service. The content may be loaded in an "as needed" or lazy basis in which only the content that is proximate to the content being currently viewed or requested is loaded by the portal. The document or page may be rendered using the Document Object Module (DOM) having nodes that correspond to the topic portions identified as part of a parsing operation.

In some instances, the original view of the content (e.g., the first view mode) remains rendered by the client device but is hidden from view by the full-screen pane 202b generated by the portal. This allows the user to quickly return to the content pane 202a of the first view mode 200a by closing the full-screen pane 202b of the second view mode 200b, since the content of the first view mode 200a remains in memory and rendered in an instance of the web browser client application as shown in the content pane 202a. As discussed previously, the user may invoke or initiate the second view mode 200b at any location within the content. This allows the user to stop or pause the display of the second view mode 200a to reveal the underlying content pane 202a, navigate to a different location within the content, and then resume the second view mode 200a. Resuming or invoking the second view mode 200a may cause client or device to display the next object, element, or node below the current cursor position or the navigational reference line 230b.

As shown in FIG. 2B, the content in the second view mode 200b is displayed larger than in the first view mode 200a. The enlargement of the content helps to improve readability and may more effectively use the increased display area provided by the full-screen pane 202b. The content may be enlarged by CSS using a transform and scale operation, in combination. In this way, the content may be enlarged while maintaining the relative position of elements and preserving some of the formatting elements of the original page or document.

As also shown in FIG. 2B, an expanded cursor or pointer element 240b may also be rendered in the second view mode 200b. The pointer element 240b may be a user defined or user selected graphical element that can be customized to provide a more readily visible indicator when using the second view mode 200b to deliver a live or recorded presentation. The pointer element 240 may be defined by a scalable vector graphic (SVG) which may be implemented as a CSS property of the portal defining the second view mode 200b. In some cases, the pointer element 240b is displayed as an enlarged colored circle or other object shape, which may be configurable by the user.

To further assist with navigation and focus during a presentation, the current topic portion (e.g., the topic portion currently aligned with the navigational reference line 230b) is displayed in visual relief or otherwise visually emphasized with respect to the remainder of the displayed content. In some implementations, a darkness, color, size, or other visual property of the current topic portion is modified in order to provide a visual distinction with respect to the remainder of the content. In some implementations, a darkness, color, size, or other visual property of the other content is modified in order to provide the visual distinction with respect to the current topic portion. For example, a transparency of the remaining content may be increased using an alpha channel or other setting, which may result in a lighter, muted, or ghosted appearance for the content. As the content is toggle-scrolled, subsequent topic portions may be emphasized by emphasizing the new topic portion and/or de-emphasizing the other content displayed in the full-screen pane 202b.

As described previously, the size or font type of the displayed text in the second view mode 200b may be determined, at least in part, based on a predicted or detected display size or resolution of the client device. Thus, a client device having a larger display may result in a lower amount of scaling of the text as less scaling may be necessary in order to make the text legible to the audience or group of non-presenting users. Conversely, if a small device display is detected, the text scaling may be increased in order to facilitate legibility of the text in the second view mode 200b. As also described previously, an estimated size or resolution of a view port or window may be used to determine an amount of scaling for the text or graphics in the content when the second view mode 200b is invoked. The view port or window size may be determined by a video conferencing service or platform, a whiteboarding service, or other similar communication platform.

In some implementations, traditional (non-toggle) scrolling may also be available when in the second view mode 200b. For example, a scroll based input provided to a mouse or trackpad may be used to advance the content in an amount directed by the user, which may be more or less than would otherwise be provided via the toggle-based scrolling, described above. In some instances, manual scrolling is detected by the portal due to an intersection observer of the web browser client application. For example, when a content portion overlaps with the navigational reference line 230b, an interference may be detected and the second view mode 200b may terminate toggle-scroll mode and a user-defined or free-scroll mode may be invoked. In response to a transition to a free-scroll mode, the display of the content (emphasis and/or de-emphasis) may be returned or normalized such that all of the content has a uniform appearance or at least a relative appearance as defined by the original page or document. When in a free-scroll mode, the user may provide mouse, trackpad, or other input to control the position of the content within the full-screen pane 202b, which may allow for precise positioning of the content.

If desired, the user may return to a toggle-based scrolling by selecting a graphical control or providing other user input interpreted as a command to invoke the toggle-based scrolling. In response to the user input or command, the portal may use a set of rules to determine which topic portion should be aligned with the navigational reference line 230b. For example, using an intersection observer of the web browser client application, the portal may be able to determine a position of an overlapping content portion. If the navigational reference line 230b is closer to the beginning or top of the portion than the end or bottom of the portion, the portion may be selected as the current topic portion and the content may be positioned such that the current topic portion is aligned with the navigational reference line 230b. Similarly, if the navigational reference line 230b is closer to the end or bottom of the portion than the beginning or top of the portion, a subsequent portion may be selected as the current topic portion and the content may be positioned such that the current topic portion is aligned with the navigational reference line 230b. Different rules may apply for large and extra-large content portions in order to provide a result that is predicted to align with a user's expectations or improve readability of the content. For example, for portions having a length greater than a predetermined threshold, an overlap condition may position the content such that the top of the long portion is aligned with the navigational reference line 230b, regardless of where the intersection occurs. Additionally, for portions having a length greater than the predetermined threshold, the toggle-based scroll input may be used to advance the scroll of the display a predetermined amount (typically some amount less than the length of the long portion) thereby allowing the user to scroll through the longer portion for viewing without immediately skipping to the next portion or node in the content.

The software platform of FIGS. 2A-2B may be any suitable software platform. An example software platform may be a collaboration tool or platform that is one of a suite of collaboration tools defining a collaborative work environment. Example collaboration tools can include, without limitation: messaging services; telecommunication services; videoconferencing services; issue tracking services; repository services; documentation services; document management systems; knowledge sharing systems; project management services; enterprise resource planning services; supply chain management services; and so on. In the illustrated embodiment, the software platform is a documentation service of a content collaboration platform, although it is appreciated that this is merely one example.

Figure 3A:
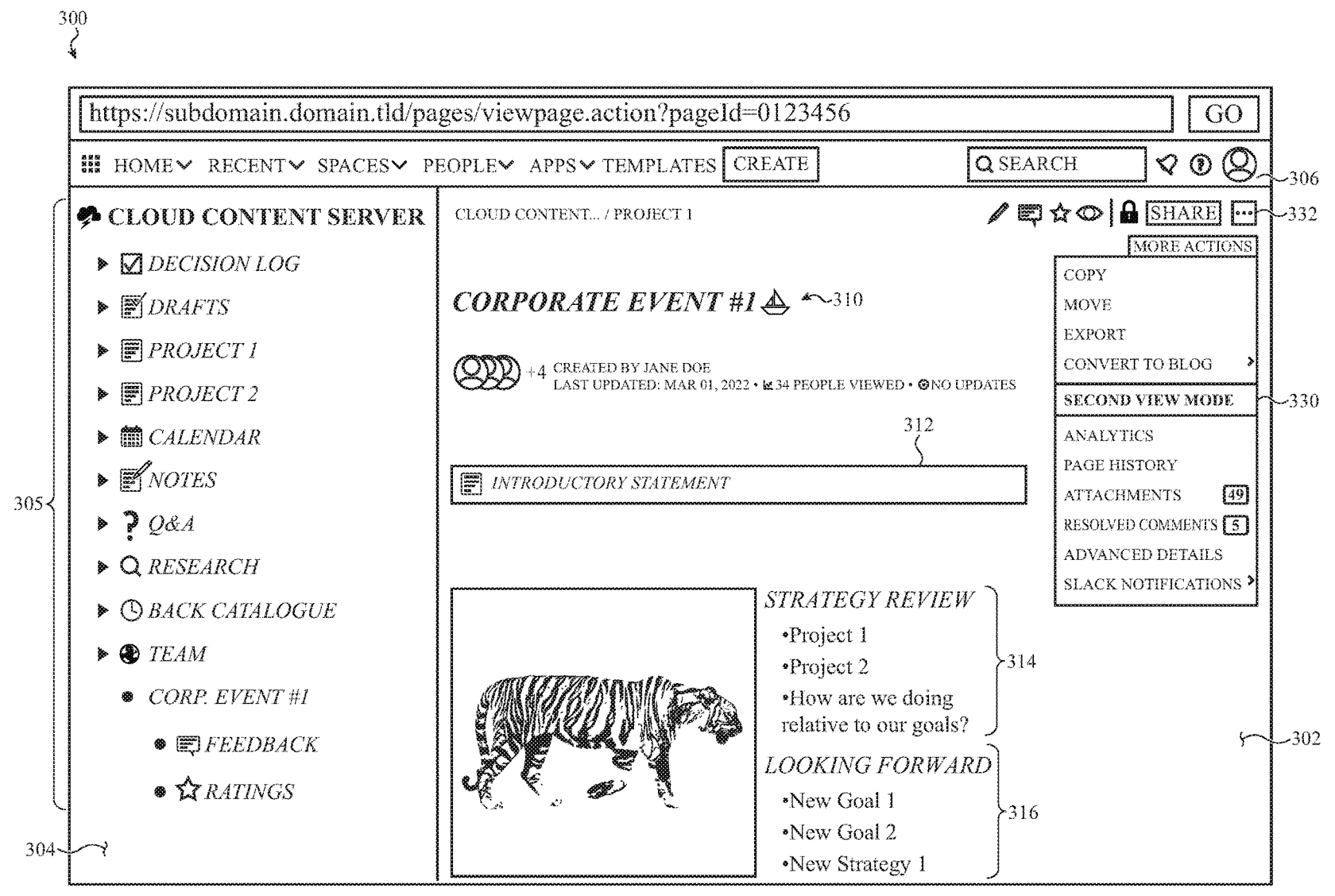
Figure 3B:
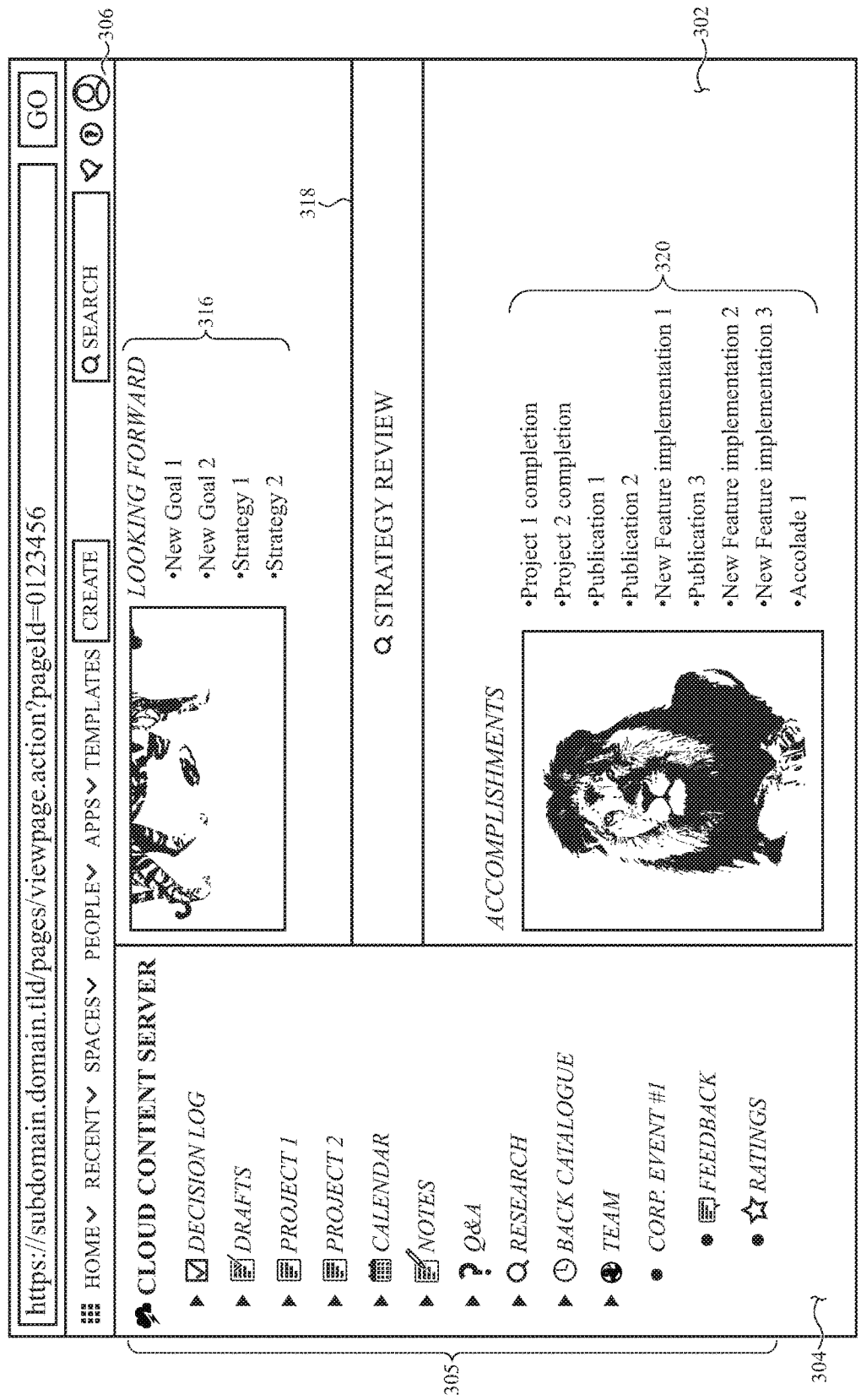

FIGS. 3A-3B depict example views of a frontend application displaying content in accordance with a first view mode. In accordance with the examples provided herein, FIGS. 3A-3B depict a first view mode 300, also referred to herein as an asynchronous view mode, non-paginated view mode, or free-scroll mode. In the first view mode 300, the view may scroll or position the content pane 302 using a mouse, trackpad, scroll bar, gesture, or other form of user input. As discussed previously, the scrolling may be provided in a continuous and uniform fashion free of page breaks or pauses due to regularly defined page intervals. As demonstrated in the sequential graphical user interface views of FIGS. 3A and 3B, the user may advance or scroll the content in a manual or free-form manner resulting in the display of content not visible within the limited display area of the client device.

Similar to the previous examples described herein, the first view mode 300 includes a content tree pane 304, which includes a content tree 305. As discussed previously, the content tree 305 may include a tree of selectable entries or elements that are arranged in accordance with a document or page hierarchy or order. Typically, an entry corresponding to the page or document being currently viewed is included in the content tree 305 along with entries corresponding to a set of pages or document having a hierarchical relationship to the displayed page or document.

As shown in FIG. 3A, the first view mode 300 also includes a header 306, which may include the various controls and graphical elements of the web browser client application. The header may also include various controls and graphical elements provided by the backend application for the particular platform being used. Here, the platform is a content collaboration platform used to share documentation and project wikis with other members of a team or within the company. In some cases, the content may be accessible to the public, as determined by the platform administrator and the access granted to the particular document or page.

As described previously, the user may enter a second view mode by selecting a first selectable affordance 332, which results in the display of a drop-down menu including various options including the "second view mode" option 330. Selection of the second selectable affordance (e.g., option 330) results in the display being transitioned from the first view mode 300 of FIGS. 3A-3B to the second view mode of FIGS. 4A-4D.

In accordance with a transition between modes, the content of the document or page may be parsed to identify a set of topic portions. As shown in FIGS. 3A-3B, a series of topic portions may be identified as indicated by portions 310 depicting the title 312, depicting a graphical element 314, depicting body text blocks 318, depicting a graphical element or divider and depicting another body text block and graphical element 320.

FIGS. 4A-4D depict example views of a frontend application displaying content in accordance with a second view mode. In accordance with the examples provided herein, FIGS. 4A-4D depict a second view mode 400, also referred to herein as a synchronous view mode, continuously paginated view mode, or content toggling view mode. As described previously, in the second view mode 400, the user may navigate the content using a toggle-based navigation scheme in which user input causes the user interface to automatically advance display of the content to a respective topic portion identified within the content. As demonstrated in the sequential graphical user interface views of FIGS. 4A-4D, the user may advance (or return) through the content in intervals defined by the identified topic portions. This is in contrast to free-form scrolling or page-based scrolling that may be available in other interfaces or view modes.

As described previously, the second view mode 400 may be created by invoking a portal that is rendered in front of the content rendered in the first view mode 300. The portal may generate a full-screen pane 402 and load content by querying the backend application or other content storage service. As also previously described, the document or page may be rendered using the Document Object Module (DOM) having nodes that correspond to the topic portions identified as part of a parsing operation.

Also, as described previously, the second view mode 400 results in the content being displayed in a full-screen pane 402 that extends along a substantial entirety of an available display area. The available display area may be defined by a view portal of a screen sharing service, the extents of a physical display or monitor, or view region of a video conference or other electronic communication service. As also described previously, the content may be enlarged using a transform and scale operation such that the relative position of the elements are preserved while expanding the content into the larger full-screen pane 402.

Figure 4A:
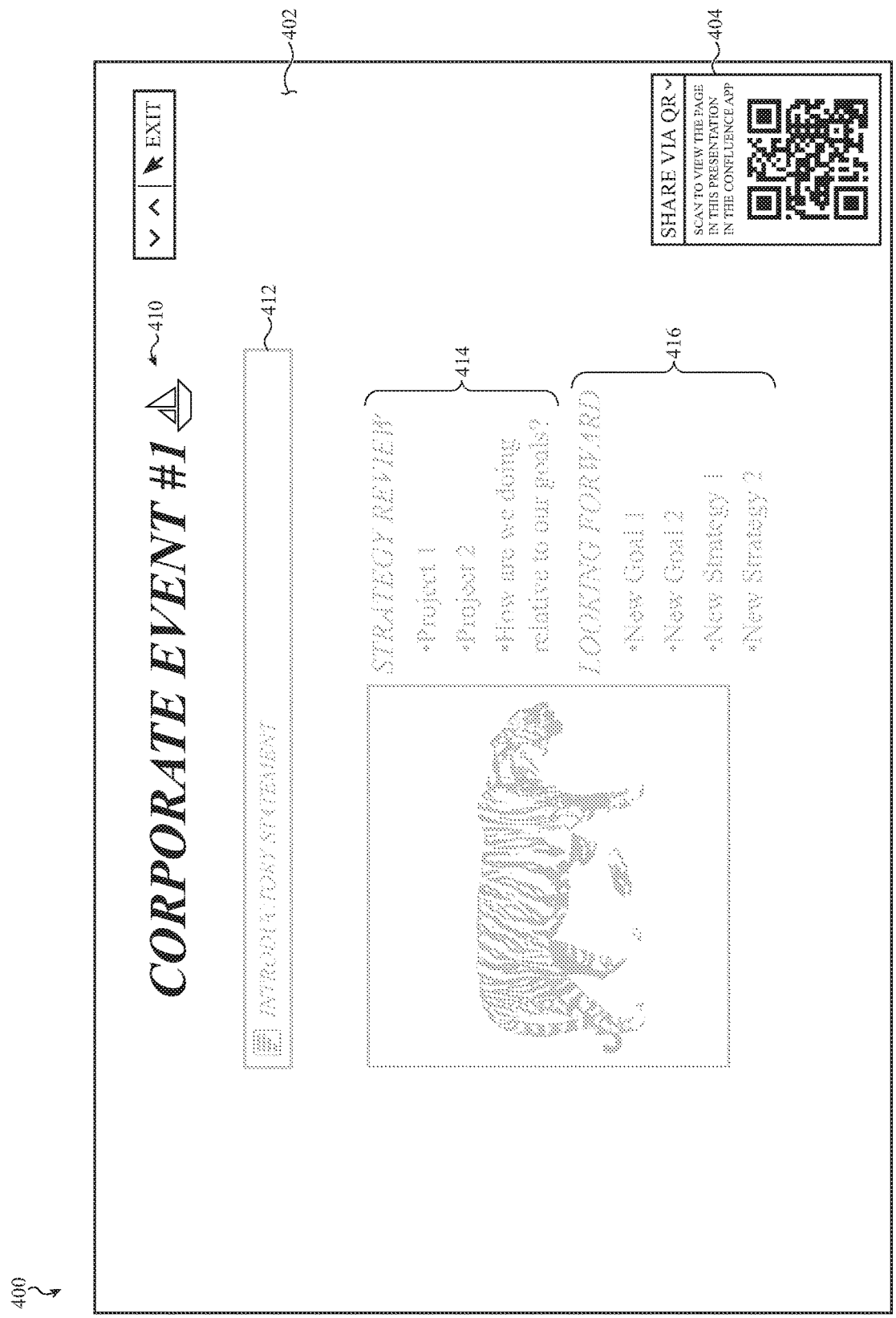
FIGS. 4A-4D depict example views of a frontend application displaying content in accordance with a second view mode.

As shown in FIG. 4A, the full-screen pane 402 may display a first topic portion, which in this case corresponds to the title 410 of the document. As discussed previously, the current topic portion may have a visual contrast or emphasis with respect to the remaining content. Here, the remaining content has an increased transparency with respect to the title 410. Other visual emphasis techniques may also be used to provide a contrast or visual distinction between the title 410 and the remainder of the content. Also, while not visually displayed in this example, a navigational reference line (e.g., 320b of FIG. 3B) may be used to align the first topic portion (e.g., the title 410) with a consistent position within the full-screen pane 402.

Figure 4B:
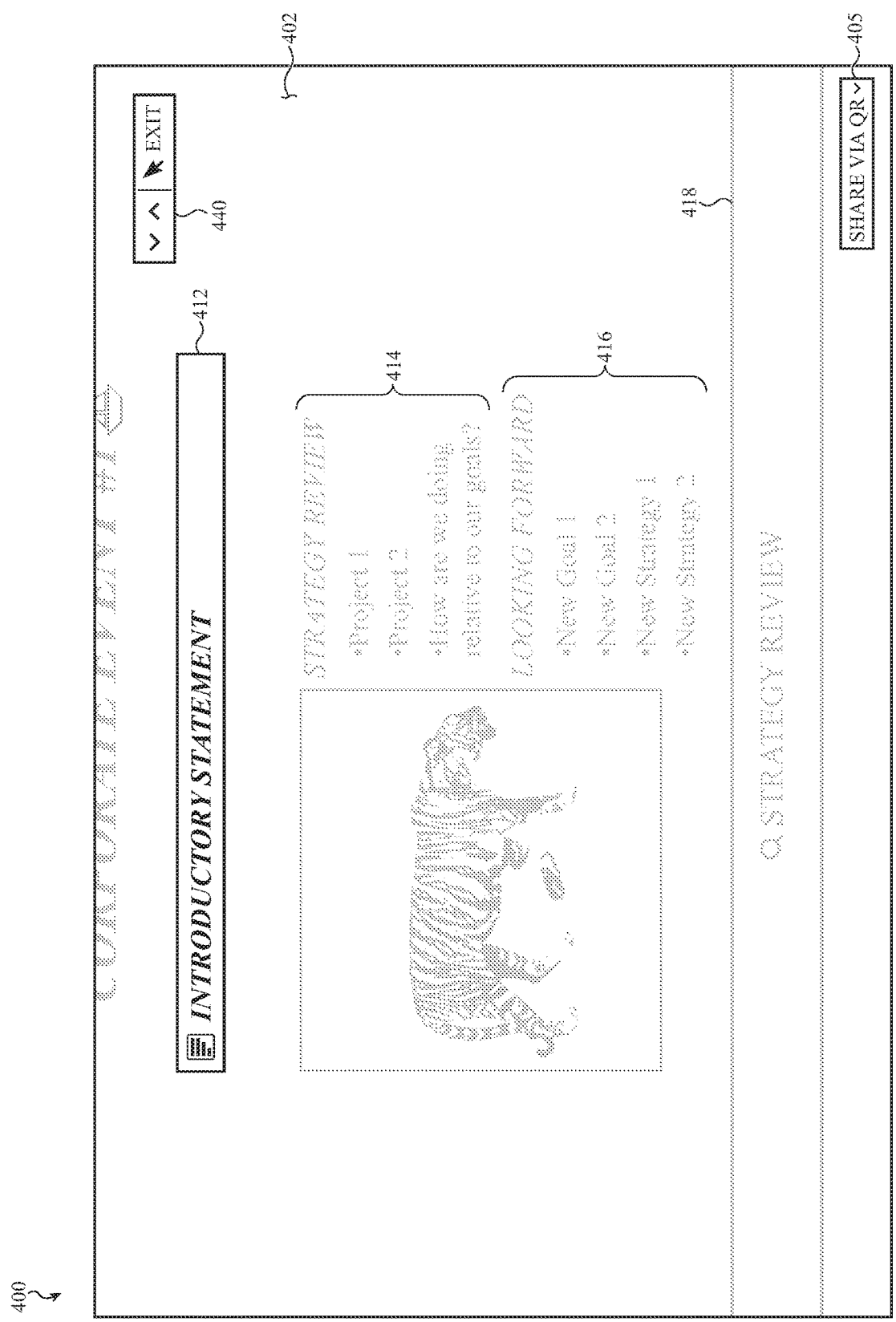

FIG. 4B depicts an example result of a user input indicating a direction or advancement of the content through the toggle-based navigation sequence. Specifically, in response to a user selection of a down arrow key (or the displayed down arrow button 440) the content may be automatically scrolled until the next topic portion (graphics box 412) is aligned with a (hidden) navigational reference line. As the content is toggled or advanced, the emphasis also changes from the first topic portion (title 410) to the second topic portion (graphics box 412).

Figure 4C:
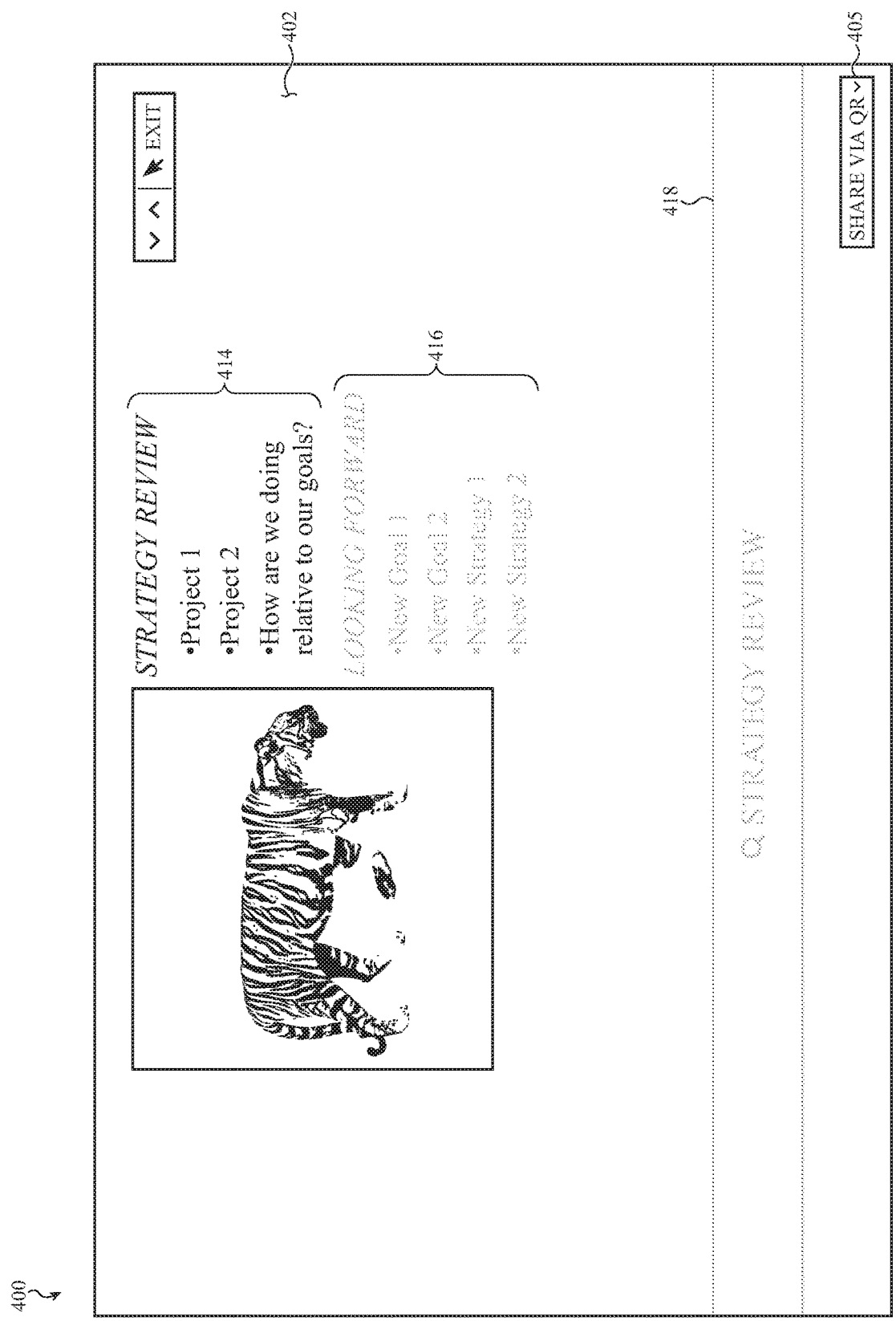
Figure 4D:
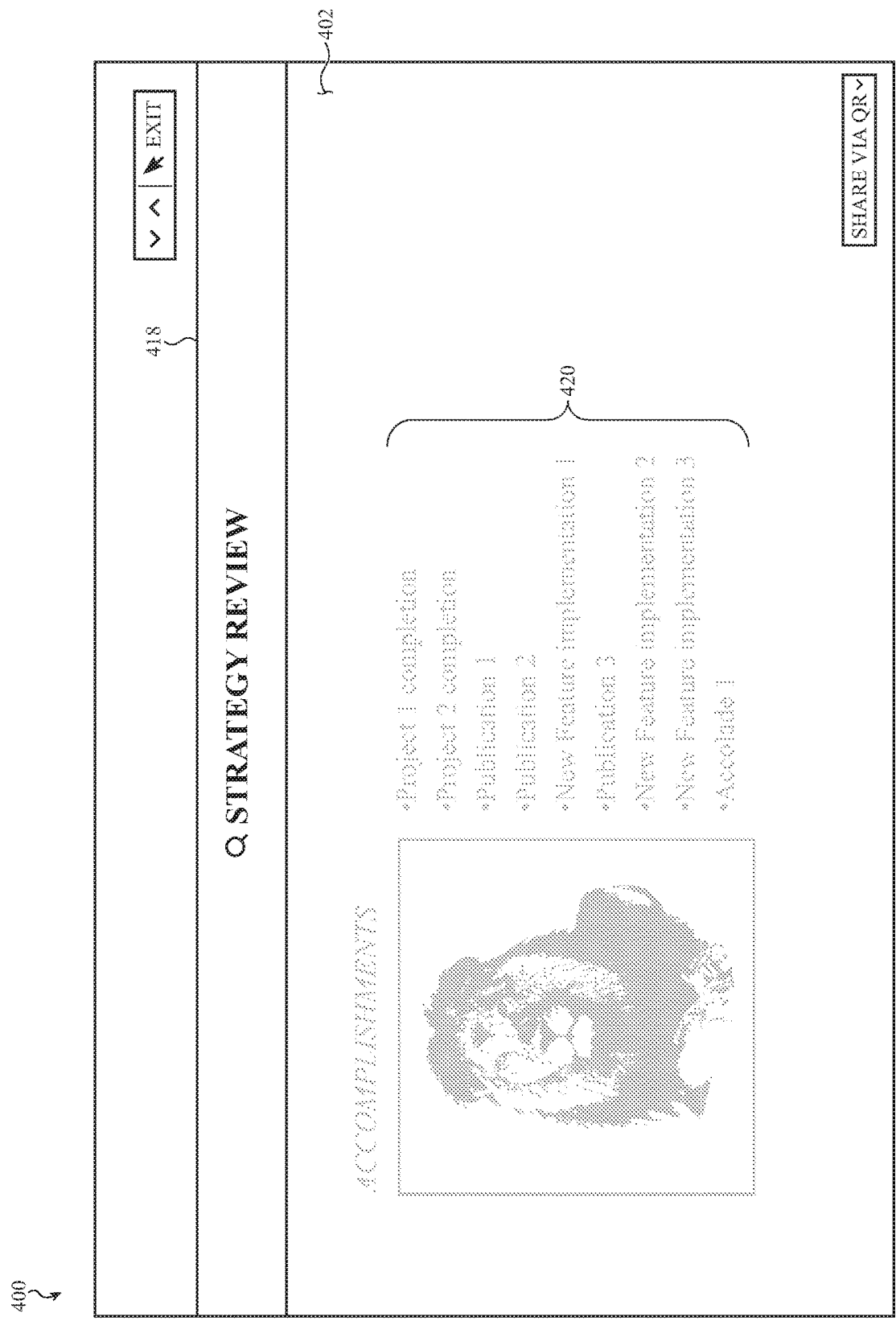

A similar advancement or toggle-based navigation is illustrated in the subsequent figures FIGS. 4C and 4D in which the content is automatically scrolled to a next topic portion. Specifically, FIG. 4C depicts a third topic portion (e.g., text block 414) and FIG. 4D depicts a fifth topic portion (e.g., graphic and divider 418). Note that, in accordance with a toggle-based navigation rule set, the content portion 416 may be skipped. For example, in accordance with the rule, adjacent text that falls within an area of a previous topic portion (e.g., the image and text 414) may be skipped during a toggle-based scroll operation. This rule may reduce the possibility of a scrolling operation that is too incremental, reducing the operational efficiency of the technique. This particular rule is optional and/or other navigational rules may be employed to provide the desired navigation sequence.

As also shown in FIG. 4A, the second view mode may result in the display of a two-dimensional encoded region. The two-dimensional encoded region (also referred to as a QR code) may be encoded with information related to a location of the page within the content collaboration platform. A user may use a corresponding two-dimensional code reader to read the encoded information, which may include an endpoint or target address that corresponds to the underlying document or page. This may allow the user to view the content asynchronously on a separate device while the presentation or second view mode is in operation. The encoded region may also allow the user to open the document or page in a dedicated client application or store the location of the document in a bookmark or recent items list. This may allow the user to quickly access and review the content (asynchronously) at a subsequent time.

FIG. 5 shows a sample electrical block diagram of an electronic device 500 that may perform the operations described herein. The electronic device 500 may in some cases take the form of any of the electronic devices described with reference to FIGS. 1-4D, including client devices, and/or servers or other computing devices associated with the collaboration system 100. The electronic device 500 can include one or more of a processing unit 502, a memory 504 or storage device, input devices 506, a display 508, output devices 510, and a power source 512. In some cases, various implementations of the electronic device 500 may lack some or all of these components and/or include additional or alternative components.

The processing unit 502 can control some or all of the operations of the electronic device 500. The processing unit 502 can communicate, either directly or indirectly, with some or all of the components of the electronic device 500. For example, a system bus or other communication mechanism 514 can provide communication between the processing unit 502, the power source 512, the memory 504, the input device(s) 506, and the output device(s) 510.

The processing unit 502 can be implemented as any electronic device capable of processing, receiving, or transmitting data or instructions. For example, the processing unit 502 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 500 can be controlled by multiple processing units. For example, select components of the electronic device 500 (e.g., an input device 506) may be controlled by a first processing unit and other components of the electronic device 500 (e.g., the display 508) may be controlled by a second processing unit, where the first and second processing units may or may not be in communication with each other.

The power source 512 can be implemented with any device capable of providing energy to the electronic device 500. For example, the power source 512 may be one or more batteries or rechargeable batteries. Additionally or alternatively, the power source 512 can be a power connector or power cord that connects the electronic device 500 to another power source, such as a wall outlet.

The memory 504 can store electronic data that can be used by the electronic device 500. For example, the memory 504 can store electronic data or content such as, for example, audio and video files, documents and applications, device settings and user preferences, timing signals, control signals, and data structures or databases. The memory 504 can be configured as any type of memory. By way of example only, the memory 504 can be implemented as random access memory, read-only memory, Flash memory, removable memory, other types of storage elements, or combinations of such devices.

In various embodiments, the display 508 provides a graphical output, for example associated with an operating system, user interface, and/or applications of the electronic device 500 (e.g., a chat user interface, an issue-tracking user interface, an issue-discovery user interface, etc.). In one embodiment, the display 508 includes one or more sensors and is configured as a touch-sensitive (e.g., single-touch, multi-touch) and/or force-sensitive display to receive inputs from a user. For example, the display 508 may be integrated with a touch sensor (e.g., a capacitive touch sensor) and/or a force sensor to provide a touch- and/or force-sensitive display. The display 508 is operably coupled to the processing unit 502 of the electronic device 500.

The display 508 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 508 is positioned beneath and viewable through a cover that forms at least a portion of an enclosure of the electronic device 500.

In various embodiments, the input devices 506 may include any suitable components for detecting inputs. Examples of input devices 506 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 506 may be configured to detect one or more particular types of input and provide a signal (e.g., an input signal) corresponding to the detected input. The signal may be provided, for example, to the processing unit 502.

As discussed above, in some cases, the input device(s) 506 include a touch sensor (e.g., a capacitive touch sensor) integrated with the display 508 to provide a touch-sensitive display. Similarly, in some cases, the input device(s) 506 include a force sensor (e.g., a capacitive force sensor) integrated with the display 508 to provide a force-sensitive display.

The output devices 510 may include any suitable components for providing outputs. Examples of output devices 510 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 510 may be configured to receive one or more signals (e.g., an output signal provided by the processing unit 502) and provide an output corresponding to the signal.

In some cases, input devices 506 and output devices 510 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 502 may be operably coupled to the input devices 506 and the output devices 510. The processing unit 502 may be adapted to exchange signals with the input devices 506 and the output devices 510. For example, the processing unit 502 may receive an input signal from an input device 506 that corresponds to an input detected by the input device 506. The processing unit 502 may interpret the received input signal to determine whether to provide and/or change one or more outputs in response to the input signal. The processing unit 502 may then send an output signal to one or more of the output devices 510, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for displaying page content in different view modes using a web browser client application, the method comprising:
    at a backend application configured to provide the page content of a content collaboration platform over a computer network to a plurality of client devices, each client device operating a frontend application comprising the web browser client application:
        in response to a request to display a page at a device of the plurality of client devices, causing display of content of the page in the web browser client application in non-paginated view mode comprising:
            the content displayed in a content pane, the content pane configured to provide continuous scrolling of the content; and
            a content tree displayed in a content tree pane, the content tree comprising a tree of selectable entries corresponding to a set of pages having a hierarchical relationship to the page; and
        in response to a request to display the content of the page in a content toggling view mode, causing display of the content in the content toggling view mode comprising:
            the content displayed in a full-screen pane that covers a substantial entirety of an available display area, the full-screen pane configured to:
                cause display of a first topic portion having a visual contrast with respect to other content of the page displayed in the full-screen pane; and
                provide toggle-based navigation in which a user input causes an automatic advance to a second topic portion of content of the page and transitions the visual contrast from the first topic portion to the second topic portion of the content displayed in the full-screen pane; and
            suppressed display of the content tree and the content tree pane such that the content tree is not displayed.

2. The computer-implemented method of claim 1, wherein:
    in response to the request to display the content of the page in the content toggling view mode:
        parsing the content of the page to identify a set of topic portions within the content, the set of topic portions including the first topic portion and the second topic portion; and
        in response to the user input causing display of the first topic portion of the set of topic portions proximate a navigational reference line defined within a full-screen pane; and
    causing display the first topic portion having a visual contrast comprises causing display of at least one subsequent topic portion of the set of topic portions with a reduced darkness with respect to the first topic portion.

3. The computer-implemented method of claim 2, wherein identifying the set of topic portions includes:
    identifying portions of the content tagged as header text;
    identifying portions of the content tagged as body text; and
    identifying portions of the content as multimedia content.

4. The computer-implemented method of claim 2, wherein identifying the set of topic portions includes, in accordance with a determination that a portion of content tagged as body text exceeds a length criteria, dividing the portion into two or more topic portions.

5. The computer-implemented method of claim 2, wherein displaying the at least one subsequent topic portion with a reduced darkness comprises displaying the at least one subsequent topic portion with an increased degree of transparency.

6. The computer-implemented method of claim 1, wherein:
    in response to the request to display the content of the page in the content toggling view mode, parsing the content of the page to identify a set of topic portions within the content, the parsing the content comprising:
        parsing a block of text tagged as body text to determine a block length; and in accordance with the block length exceeding a threshold, dividing the block of text into two or more topic portions.

7. The computer-implemented method of claim 1, wherein:
prior to displaying the content of the page in the content toggling view mode, the content is parsed to identify text satisfying a font size criteria; and
in accordance with a portion of text satisfying the font size criteria, prior to displaying the portion of the text in the content toggling view mode, increasing a font size of the portion of the text.

8. The computer-implemented method of claim 1, wherein, in response to the request to display the content of the page in the content toggling view mode, a user-defined graphical object is replaced for a current cursor graphical object.

9. The computer-implemented method of claim 1, wherein in response to the request to display the content of the page in the content toggling view mode, causing display of an option to display a two-dimensional encoded region, wherein the two-dimensional encoded region is encoded with information related to a location of the page within the content collaboration platform.

10. A computer-implemented method for displaying an electronic document in different view modes using a web browser client application, the method comprising:
displaying content of the electronic document using the web browser client application in a first view mode having:
a first pane displaying an object tree of selectable elements, each element selectable to retrieve a respective electronic document hierarchically related to the electronic document; and
a second pane displaying the content in a continuously scrollable format; and
in response to a user selection of an affordance, transitioning from the first view mode to a second view mode, by:
parsing the content to identify a series of topic portions within the content;
causing display of the content in a full-screen view thereby removing the first pane from view;
causing display of a first topic portion of the series of topic portions having a visual contrast with respect to other content displayed in the full-screen view;
in response to a user input indicating a direction:
causing the content to advance from the first topic portion of the series of topic portions to a second topic portion of the series of topic portions; and
causing the visual contrast to transition from the first topic portion and to the second topic portion.

11. The computer-implemented method of claim 10, wherein:
in response to parsing the content, evaluating text with respect to a viewing criteria; and
in accordance with the text satisfying the viewing criteria, modifying a property of the text before causing display of the text in the full-screen view.

12. The computer-implemented method of claim 10, wherein:
in response to parsing the content, evaluating text with respect to a viewing criteria; and
in accordance with the text satisfying the viewing criteria, suppressing display of the text in the full-screen view.

13. The computer-implemented method of claim 10, wherein:
in response to parsing the content, identifying in-line comments embedded in the content; and
in accordance with identifying the in-line comments, suppressing display of the in-line comments in the full-screen view.

14. The computer-implemented method of claim 10, wherein in response to a scrolling input when in the second view mode, cause a continuous scrolling of the content.

15. The computer-implemented method of claim 10, wherein identifying the series of topic portions includes identifying content tags within the electronic document, the content tags comprising a header content tag, a body content tag, and a multimedia content tag.

16. A computer-implemented method, comprising:
at a backend application configured to provide content over a distributed network to a plurality of client devices, each operating a frontend application comprising a web browser client application:
in response to a request to display the content at a device of the plurality of client devices, cause display of the content in the web browser client application in an asynchronous view mode comprising:
the content displayed in a content pane, the content pane configured to provide continuous and uniform scrolling of the content; and
a content tree displayed in a content tree pane, the content tree comprising selectable entries corresponding to a set of content objects having a hierarchical relationship to the displayed content;
in response to a request to display the content in a synchronous view mode, cause display of the content in the synchronous view mode comprising:
the content displayed in a full-screen pane that covers a substantial entirety of a display area, the full-screen pane configured to:
cause display of a first topic portion of the content having a visual contrast with respect to other portions of the content;
provide topic-based scrolling in which a user input causes an advance from the first topic portion to a second topic portion of the content and transitions the visual contrast from the first topic portion and to the second topic portion; and
suppressed display of the content tree content and the content tree pane such that the content tree content is not displayed.

17. The computer-implemented method of claim 16, wherein:
in response to the request to display the content in the synchronous view mode:
parsing the content to identify a set of topic portions;
in response to a first user input, causing display of the first topic portion of the set of topic portions proximate to a top region of the full-screen pane; and
in response to a second user input, causing display of second topic portion of the set of topic portions proximate to the top region of the full-screen pane.

18. The computer-implemented method of claim 17, wherein:
in response to the request to display the content of the page in the synchronous view mode and in response to the first user input:
causing display of at least one subsequent topic portion of the set of topic portions, the at least one subsequent topic portion displayed with a reduced darkness with respect to the first topic portion.

19. The computer-implemented method of claim 17, wherein in response to parsing the content, a document object model is created having a set of document nodes, each document node corresponding to a respective topic portion of the set of topic portions.

20. The computer-implemented method of claim 16, wherein in response to the request to display the content in the second view mode, causing display of an option to display a two-dimensional encoded region, wherein the two-dimensional encoded region is encoded with information related to a location of the content within a content collaboration platform.

\* \* \* \* \*